Dec. 23, 1958
W. STRAUSS
2,865,050
VALVED GATE FOR AN INJECTION MOLDING PRESS
Filed June 6, 1955
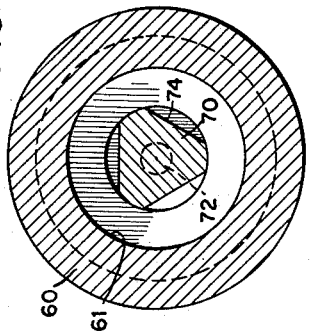
FIG.3
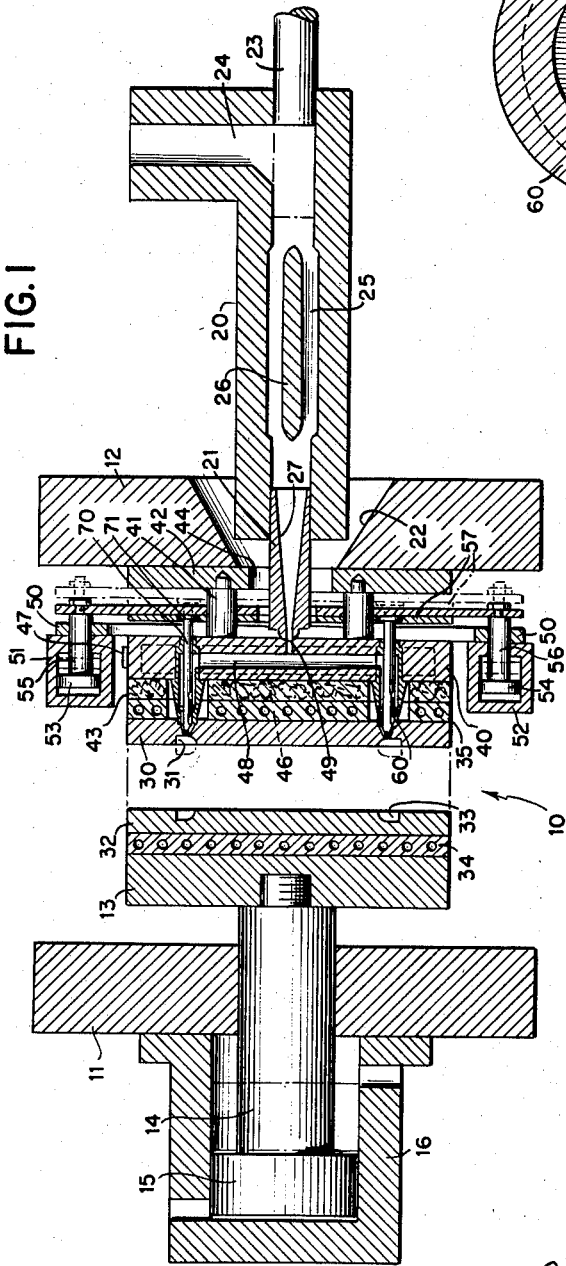
FIG.1
FIG.2
William Strauss
*INVENTOR.*
BY
*Adams, Forward & McLean*
ATTORNEYS United States Patent Office 2,865,050
Patented Dec. 23, 1958

2,865,050

VALVED GATE FOR AN INJECTION MOLDING PRESS

William Strauss, Philadelphia, Pa., assignor to F. J. Stokes Corporation, Philadelphia, Pa., a corporation of Pennsylvania Application June 6, 1955, Serial No. 513,475

3 Claims. (Cl. 18—30)

My invention relates to injection molding, and, in particular, relates to a process in which a molding material in a heated, plastic or molten state is injected into a heated chamber from which it is passed to a cooled die cavity insulated from the heated chamber through a channel which passes through the insulation and in which the channel is provided with a valve located in the proximity of the die cavity to seal communication between the heated chamber and die cavity between the periodic injections of fluent molding material into the heated chamber. Such an injection molding press and injection molding method are more completely described in my copending application Serial No. 396,660, filed December 7, 1953, now Patent No. 2,828,507.

A practical construction for providing the necessary valving action, as is disclosed in my copending application, is a pin valve which extends slidably within the channel which communicates between the die cavity and the heated chamber to seal the channel at its entry into the die cavity preferably with a flush fit, thus avoiding the necessity of sprue formation and subsequent irregularity on the surface of the molded article. The pin, of course, need not be brought to a flush fit with the interior of the die cavity where a projection or depression are required at the gate location.

In such a construction the tip of the pin valve is withdrawn from its sealing position at the die cavity end of the channel during the injection stroke to admit passage of fluent, heated molding material from the interior of the heated chamber through the channel into the die cavity. Because the channel defining member which extends between the heated chamber and mold is in contact with both the heated chamber and the cooled mold, there is a tendency for material retained in the channel behind the seal to solidify during the interval in which the injected material is cooled within the die cavity and in which the molded article is ejected from the die cavity. Thus when the pin valve is withdrawn during the subsequent injection stroke, its tip must be pulled back clear of any such solidified material in order to permit passage of fluent molding material into the die cavity.

It is, however, desirable to make the pin valve stroke as short as possible in order to provide maximum mold separation space. It is, moreover, disadvantageous to have solid molding material present in the channel during the injection stroke which the flow of fluent molding material into the die cavity can loosen and force into the channel toward the die cavity. This frequently can jam the channel preventing a full charge from being delivered into the die cavity and damaging the tip of the sealing pin upon its return stroke to a closed position.

It is the principal object of this invention to provide a pin valve construction which will assure clean delivery of fluent molding material through the channel despite dislodging of solidified molding material formed in the channel back of the seal while the pin valve member seals the channel.

It is a further object of this invention to provide a pin valve construction of extremely simple construction which obviates the need of special internal shoulders and similar difficultly fabricated constructions to prevent dislodging of solidified molding material and which relies upon the dislodging of such solidified molding material to prevent its being swept into the valve opening.

For a more complete understanding of the principles of my invention reference is made to the appended drawings in which:

Figure 1 is a vertical sectional view taken through an injection molding press having a heated chamber interposed between the injection nozzle and die cavity which includes the pin valve construction of my invention showing the sealing pins in closed position;

Figure 2 is an enlarged vertical sectional fragmentary view of the channel construction in Figure 1 illustrating a sealing pin in open position; and Figure 3 is a cross-sectional view of the channel construction taken at line 3—3 in Figure 2.

Referring particularly to Figure 1 injection molding press 10 includes a rigidly mounted abutment 11 and a fixed platen 12. A movable platen 13 is rigidly fixed to main power ram 14 which slidably passes horizontally through abutment 11 and terminates in piston 15 which is slidable within a hydraulic cylinder 16 rigidly fixed on the outer face of abutment 11. Suitable hydraulic means (not shown) are employed to reciprocate piston 15 horizontally within cylinder 16 thus causing movable platen 13 to reciprocate horizontally within the space between abutment 11 and fixed platen 12.

An injection device 20 terminating in an injection nozzle 21 extends through an aperture 22 in the rear face of fixed platen 12. Injection device 20 is provided with a hydraulically powered piston 23 which moves from the position shown in solid lines to the dotted line position under externally supplied hydraulic pressure to deliver a charge of molding material from chamber 24 to heating chamber 25 which is provided with a mandrel heating device 26 and which communicates at its remote end with a tapered channel 27 through nozzle 21.

The inner face of fixed platen 12 supports a fixed die plate 30 which contains die cavities 31. These are positioned to align with corresponding die cavities 33 on a cooperating movable die plate 32, which is backed up by a rigidly attached cooling plate 34 containing passages for the flow of liquid coolant and which is rigidly secured to horizontally reciprocable platen 13. Die plate 30 is similarly backed up with a rigidly attached cooling plate 35 similarly provided with passages for flow of liquid coolant and is rigidly attached by mounting pins (not visible) to chambered plate 40 being spaced a short distance therefrom. Chambered plate 40 in turn is supported upon horizontal pins 41 which are rigidly affixed to plate 42 which is in turn rigidly affixed to the inner face of fixed platen 12. A layer of insulating material 43 is interposed between cooling plate 35 and chambered plate 40 to minimize heat loss by radiation from plate 40 to plate 35.

Plate 42 is provided with a central aperture 44 which aligns with aperture 22 in fixed platen 12 and through which injection nozzle 21 extends up to a position in which the tip of nozzle 21 abuts chambered plate 40. Chambered plate 40 is provided with several vertical passages 46 which receive electrical resistance heating elements 47 and is provided with a central chamber 48. A horizontal passageway 49 in plate 40 communicates between chamber 48 and the abutting tip of nozzle 21 registering with the opening from passage 27 in nozzle 21.

An open-centered crosshead 50 is secured to the face of chambered plate 40 remote from die plate 30 and carries a cylinder 51 positioned above chambered plate 40 and a cylinder 52 positioned beneath chambered plate 40. Cylinders 51 and 52 contain horizontally reciprocable pistons 53 and 54, respectively, to which are affixed piston rods 55 and 56, respectively. Piston rods 55 and 56 slidably extend horizontally through crosshead 50 terminating between crosshead 50 and fixed platen 12 supporting between them at their terminal ends a yoke 57 which is mounted in sliding engagement on pins 41 for horizontal reciprocation within the space between crosshead 50 and plate 52. Cylinders 51 and 52 are provided with suitably hydraulic means (not shown) for producing simultaneous reciprocation of pistons 53 and 54 to reciprocate yoke 57.

Referring more particularly to Figure 2, a bushing 60 is mounted on chambered plate 40 aligned with each of die cavities 31 projecting inwardly from chambered plate 40 toward die plate 30 through suitable apertures in insulation 43 and cooling plate 35 up to and abutting die plate 30, suitably received by die plate 30 to insure mechanical stability. Each bushing 60 is provided with a central passage 61 which communicates with chamber 48 at one end and which extends at its other end through die plate 30 into die cavity 31.

An elongated cylindrical pin 70 enters the outer face of chambered plate 40 in fluid-tight sliding engagement therewith and extends through channel 61 and to die cavity 31. The terminal end 71 of pin 70 is affixed to and carried by yoke 57 such that horizontal reciprocation of yoke 57 will cause horizontal reciprocation of pin 70 within channel 61. At its end adjacent die cavity 31, pin 70 is tapered at 73 down to a smaller diameter from which a cylindrical tip 72 projects. Three flats 74 extend lengthwise of pin 70 up to the taper 73.

Channel 61 at its end 61a adjacent chamber 48 is relatively larger in diameter than pin 70 such that fluent molding material can flow through end portion 61a along pin 70. At its end 61b adjacent die cavity 31, channel 61 has a reduced diameter slidingly receiving pin 70. Channel 61 where it enters die cavity 31 is tapered as indicated most clearly at 62 in Figure 2 to a small opening 63 which provides a snug, fluid-tight, peripheral sliding fit for tip 72 of pin 70.

In operation press 10 is closed by reciprocating piston 15 to cause die plate 32 to abut die plate 30 with die cavities 31 and 33 aligned. At this point pistons 53 and 54 are in the retracted solid-line position shown in Figure 1 with tips 72 of pins 70 extended into openings 63 of channels 61 in a flush fit with the interior of die cavities 31. Plunger 23 is retracted in the solid-line position shown in Figure 1 with chamber 24 loaded with a freshly supplied charge of pulverant molding material. Chamber 25, nozzle passage 27, chamber 48 and channel 61 contain heated, fluent molding material.

Piston 23 is then reciprocated toward its dotted-line position shown in Figure 1 forcing molding material from chamber 25 through nozzle 27 into chamber 48. Immediately after piston 23 starts to build up pressure in confined chamber 48, pistons 53 and 54 are reciprocated to the dotted-line position shown in Figure 1, reciprocating pins 70 to the position shown most clearly in Figure 2 in which they are substantially withdrawn from end portion 61b of channel 61 admitting fluent molding material through end portion 61b into die cavity 31—33, the cavity then being filled with fluent molding material.

Thereafter pistons 53 and 54 are retracted to the solid-line position moving the tips 72 of pins 70 back into a flush fit with the inner surface of die cavities 31, sealing off communication of channel 61 with die cavity 31—33. Piston 23 is then retracted to the solid-line position shown in Figure 1 and the fresh charge of molding material from chamber 24 drops into position in chamber 25 for the next injection stroke. Suitably at this point a fresh charge of pulverant molding material is placed in chamber 24.

The mold is retained closed for a period of time sufficient to allow the charge of fluent molding material in die cavity 31—33 to solidify.

By reason of the abutting contact of bushing 60 and die plate 30 and also by reason of the fact that the tapered portion 62 of channel 61 lies in die plate 30, there is a tendency for solidification of fluent molding material in channel 61 to take place in the conically annular space between tapered portion 62 of channel 61 and tapered portion 73 of pin 70 and along the space between the inner walls of end portion 61b of channel 61 and flats 74. When the molded article has been ejected in the conventional manner and pins 70 are again withdrawn to admit a fresh charge of fluent molding material into each die cavity 31—33 the solidified material in channel 61 tends to be loosened. Thereupon, the three strips of solidified molding material lying along flats 74 fall together at their ends remote from die cavity 31. They, however, remain joined at their ends adjacent die cavity 31 where they are connected by the conical annulus of solidified molding material which formed between tapered portions 62 and 73 of channel 61 and pin 70, respectively, and thus back each other up in a bridge which prevents their being forced downstream in channel 61 to clog opening 63.

During the injection, of course, the solidified material in channel 61 tends to refluidize because of the heat contained in the fresh fluent molding material passing through channel 61. The volume of solidified molding material in channel 61 is thus considerably reduced by the end of the injection stroke. Even so reduced, the remaining solidified molding material in channel 61 is held in place and jamming of tapered portion 62 and of opening 63 of channel 61 is thereby prevented. It will also be noted that at the end of the injection stroke as each pin 70 is reciprocated to insert tip 72 into opening 63, a space is provided about the opening and along flats 74 which allows excess fluent molding material ahead of tip 72 to back up around pin 70. The force required to reciprocate pins 70 to seal off die cavities 31—33 is thus substantially reduced, and the point of operation at which the seal is obtained and the volume of fluent molding material forced into die cavities 31—33 by the closing action of pins 70 are fixed from one cycle to the next.

I claim:

1. A device for delivering a charge of fluent molding material from a heated zone to a cooled die cavity under the application of pressure to the heated zone which comprises means defining a channel communicating between said heated zone and said die cavity, a tapered portion in said channel at the entry thereof into said die cavity, said tapered portion being reduced to a small opening as said channel enters said die cavity, a pin valve member extensible in said channel in sliding engagement with the inner walls thereof, the end of said pin valve member adjacent said die cavity being tapered to a smaller cross-section than the remainder of said pin valve member more remote from said die cavity, a pin projecting from said tapered portion of said pin valve member having a cross-section smaller than the cross-section of the portion of said pin valve member beyond said tapered portion and fitting said opening of said channel into said die cavity in fluid-tight peripheral contact, a plurality of flats extending lengthwise on said pin valve member up to said tapered portion thereof and extending along the portion thereof in sliding engagement with the inner walls of said channel, and means for reciprocating said pin valve member in said channel between a closed position in which said pin peripherally contacts said opening of said channel into said die cavity and in which the tapered portion of said channel and the tapered portion of said pin valve member define a conical annular space therebetween and an open position in which said pin is withdrawn to admit flow of fluent material through said channel.

2. An injection molding press which comprises mold means defining a die cavity, cooling means for said mold means, a chambered plate insulated from said mold means, heating means for said chambered plate, a bushing projecting from said chambered plate and contacting said mold means, a channel extending through said bushing communicating between said die cavity and the interior of said chambered plate, a pin valve member extensible in said channel in sliding engagement with the inner walls thereof, the end of said pin valve member adjacent said die cavity being tapered to a smaller cross-section than the remainder of said pin valve member remote from said die cavity, a pin projecting from said tapered portion of said pin valve member having a cross-section smaller than the cross-section of the portion of said pin valve member beyond said tapered portion and fitting said opening of said channel into said die cavity in fluid-tight peripheral contact, a plurality of flats extending lengthwise on said pin valve member up to said tapered portion thereof and extending along the portion thereof in sliding engagement with the inner walls of said channel, injection means for delivering periodic charges of heated fluent molding material into said chambered plate, and means for reciprocating said pin valve member in said channel in timed relation with the operation of said injection means between a closed position in which said pin peripherally contacts said opening of said channel into said die cavity and in which the tapered portion of said channel and the tapered portion of said pin valve member define a conical annular space therebetween and an open position in which said pin is withdrawn to admit flow of fluent molding material through said channel.

3. In an injection molding press, a pin valve member having one end thereof tapered to a smaller cross-section than the remainder of said pin valve member, a pin projecting from said tapered portion of said pin valve member having a cross-section smaller than the cross-section of the remainder of said pin valve member, and a plurality of flats extending lengthwise on the remainder of said pin valve member up to said tapered portion thereof.

References Cited in the file of this patent

UNITED STATES PATENTS

| | | |
|---|---|---|
| 1,036,778 | Baker | Aug. 27, 1912 |
| 2,227,263 | Knowles | Dec. 31, 1940 |
| 2,471,148 | Gale et al. | May 24, 1949 |
| 2,770,011 | Kelly | Nov. 13, 1956 |